(12) United States Patent
Jeffs

(10) Patent No.: US 8,827,382 B1
(45) Date of Patent: Sep. 9, 2014

(54) TRACK CLEANING SYSTEM

(76) Inventor: Michael R. Jeffs, Orem, UT (US)

( * ) Notice: Subject to any disclaimer, the term of this patent is extended or adjusted under 35 U.S.C. 154(b) by 290 days.

(21) Appl. No.: 13/343,864

(22) Filed: Jan. 5, 2012

(51) Int. Cl.
   *B62D 55/088* (2006.01)

(52) U.S. Cl.
   USPC .......................... 305/108; 305/112; 305/114

(58) Field of Classification Search
   CPC ...................... B62D 55/088; B62D 55/0882
   USPC ......... 305/100, 107, 108, 109, 110, 111, 112, 305/114
   See application file for complete search history.

(56) References Cited

U.S. PATENT DOCUMENTS

| | | | |
|---|---|---|---|
| 3,035,872 A * | 5/1962 | Rich | 305/108 |
| 3,899,219 A | 8/1975 | Boggs | |
| 3,924,905 A * | 12/1975 | Simmons | 305/108 |
| 3,976,337 A | 8/1976 | Vaughn | |
| 4,830,439 A | 5/1989 | Collins et al. | |
| 5,725,292 A | 3/1998 | Keedy et al. | |
| 5,762,408 A * | 6/1998 | Marsh | 305/108 |
| 5,775,447 A | 7/1998 | Dester et al. | |
| 6,247,547 B1 | 6/2001 | Lemke et al. | |
| 6,536,851 B2 | 3/2003 | Grob et al. | |
| D598,937 S | 8/2009 | Lyasko | |
| 7,832,814 B2 | 11/2010 | Breton | |
| 2012/0146398 A1 * | 6/2012 | Nebergall et al. | 305/108 |
| 2012/0146399 A1 * | 6/2012 | Nebergall et al. | 305/108 |

FOREIGN PATENT DOCUMENTS

| | | | |
|---|---|---|---|
| DE | 4239613 A1 * | 5/1994 | |
| JP | 08244658 A * | 9/1996 | |
| JP | 10007038 A * | 1/1998 | |
| JP | 2000255463 A * | 9/2000 | |
| JP | 2001341678 A * | 12/2001 | |
| JP | 3917645 B1 * | 5/2007 | |

* cited by examiner

*Primary Examiner* — Kip T Kotter

(57) ABSTRACT

A track cleaning system for continuous cleaning of an endless track assembly on a machine so equipped. The system has at least one first side wiper bar assembly, and at least one second side wiper bar assembly. The system also has at least one track shoe that is a member of the endless track assembly. A track assembly inside cavity is formed by a track assembly outer periphery of the endless track assembly, where upon rotational operation of the endless track assembly, the track cleaning system rotates about the track assembly inside cavity. Debris is scraped from and away from the track assembly inside cavity and removed. As a result, less debris is introduced to the endless track assembly components of the endless track assembly.

13 Claims, 7 Drawing Sheets

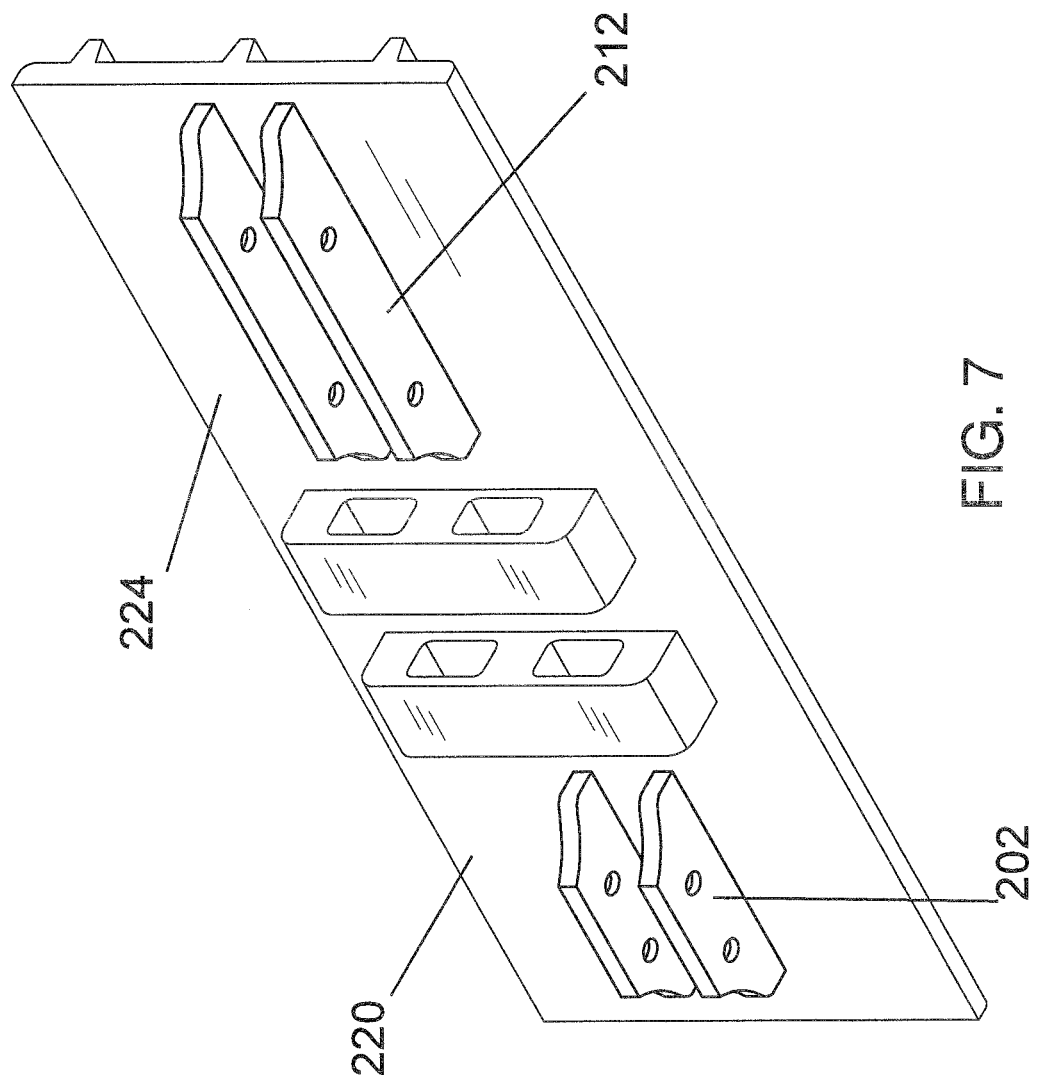

US 8,827,382 B1

TRACK CLEANING SYSTEM

BACKGROUND OF THE INVENTION

Tracked vehicle technology has been used for more than two hundred years to provide increased weight distribution for a heavy vehicle for use on a soft surface, where a vehicle could become stuck due to sinking. Vehicles equipped with continuous, or endless, tracks are often used on construction sites or in areas where loose surface materials can be picked up by the track shoes and introduced into and onto the mechanical drive components of the endless track system. The present invention addresses the need to remove any collected loose debris, thereby prolonging the life of the mechanical drive components of the endless track system.

SUMMARY

The present invention features a track cleaning system for continuous cleaning of an endless track assembly.

In some embodiments, the track cleaning system has at least one first side wiper bar assembly having a first side wiper bar bracket and a first side wiper bar flap, detachably connected to the first side wiper bar bracket. In some embodiments, the track cleaning system further comprises at least one second side wiper bar assembly having a second side wiper bar bracket and a second side wiper bar flap, detachably connected to the second side wiper bar bracket.

In some embodiments, the track cleaning system further has at least one track shoe that is a member of the endless track assembly. In some embodiments, the first side wiper bar bracket is attached to a track shoe interior surface of a track shoe first side, and the second side wiper bar bracket is attached to a track shoe interior surface of a track shoe second side.

In some embodiments, a track assembly inside cavity is formed by a track assembly outer periphery of the endless track assembly. In some embodiments, upon rotational operation of the endless track assembly, the track cleaning system rotates about the track assembly inside cavity where debris is scraped from and away from the track assembly inside cavity and thrust aside.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 7 is a perspective top view of an alternate embodiment of the track shoe of the present invention.

DESCRIPTION OF PREFERRED EMBODIMENTS

Figure 1:
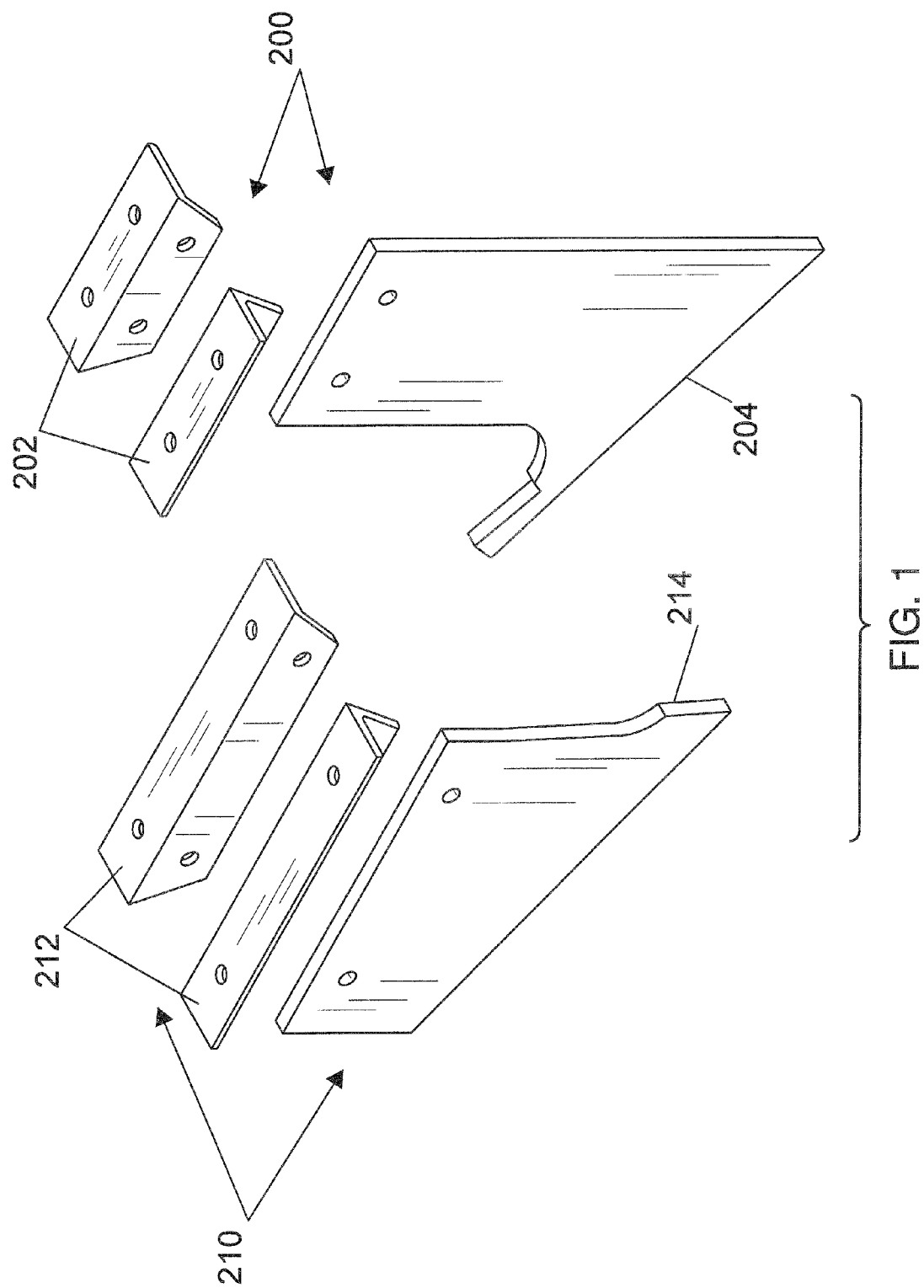
FIG. 1 is an exploded perspective view of a preferred embodiment of the first side and second side wiper bar assemblies of the present invention.
Figure 2:
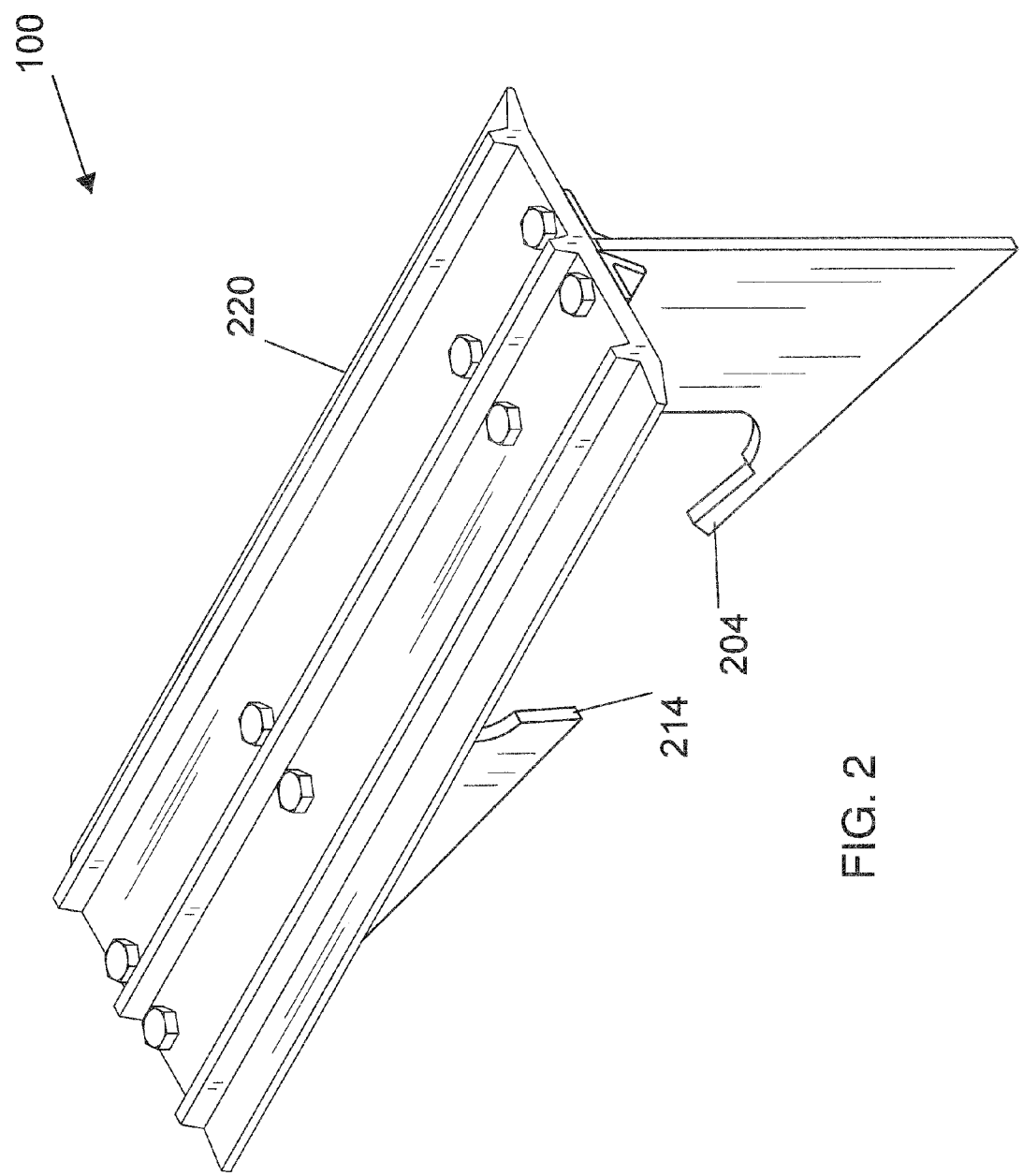
FIG. 2 is a perspective top view of the track cleaning system of the present invention.
Figure 3:
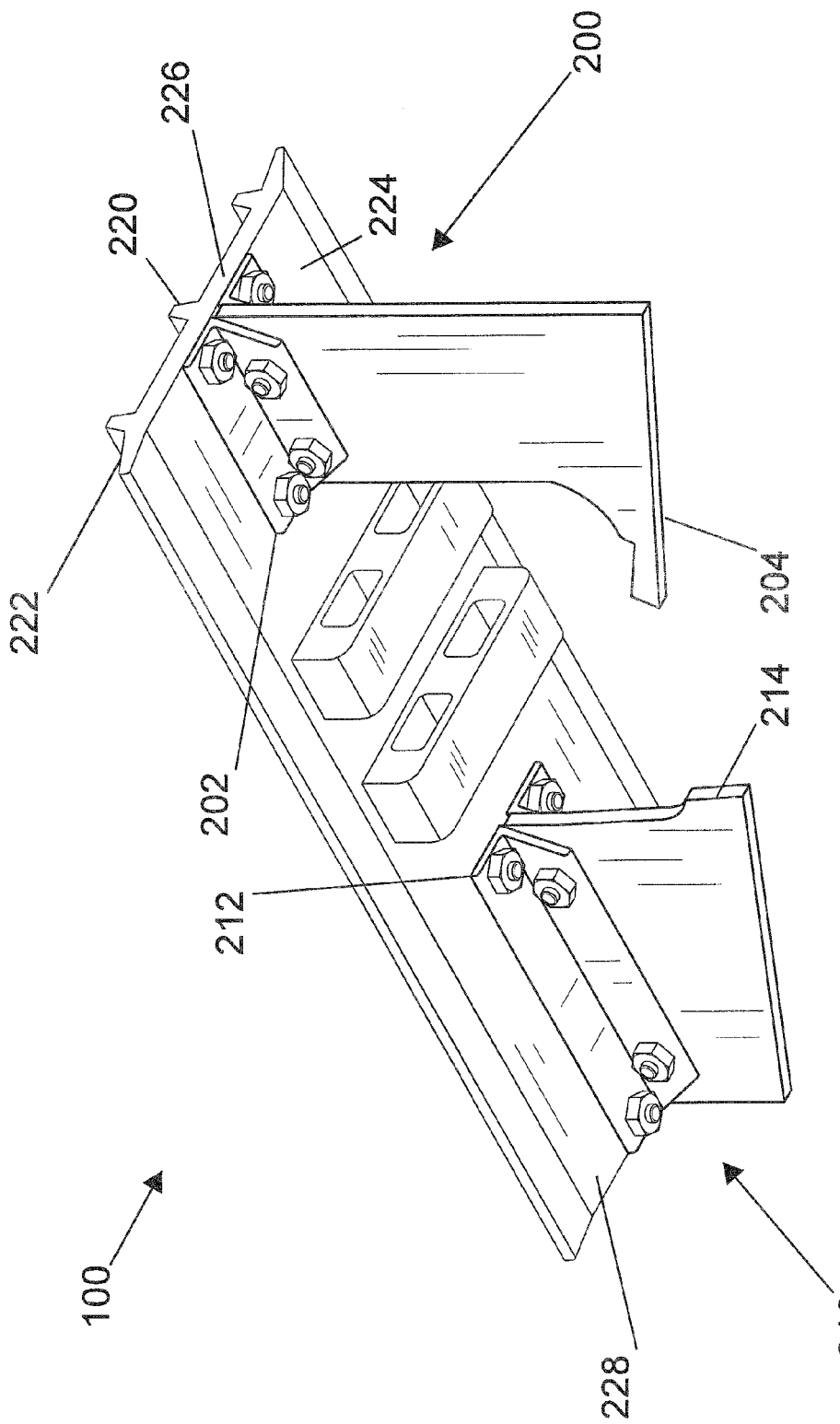
FIG. 3 is a perspective bottom view of the track cleaning system of the present invention.
Figure 4:
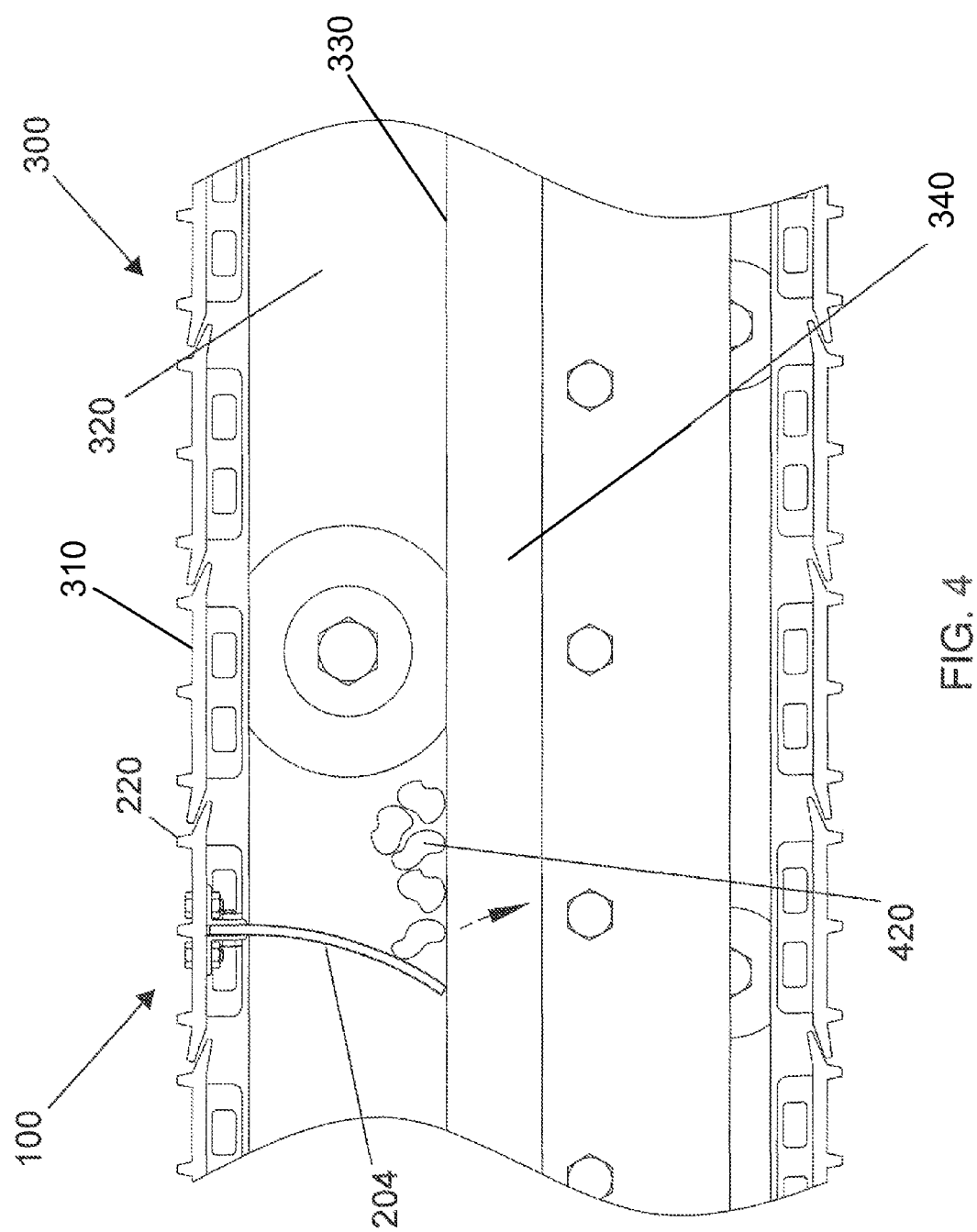
FIG. 4 is a side view of the track cleaning system of the present invention.
Figure 5:
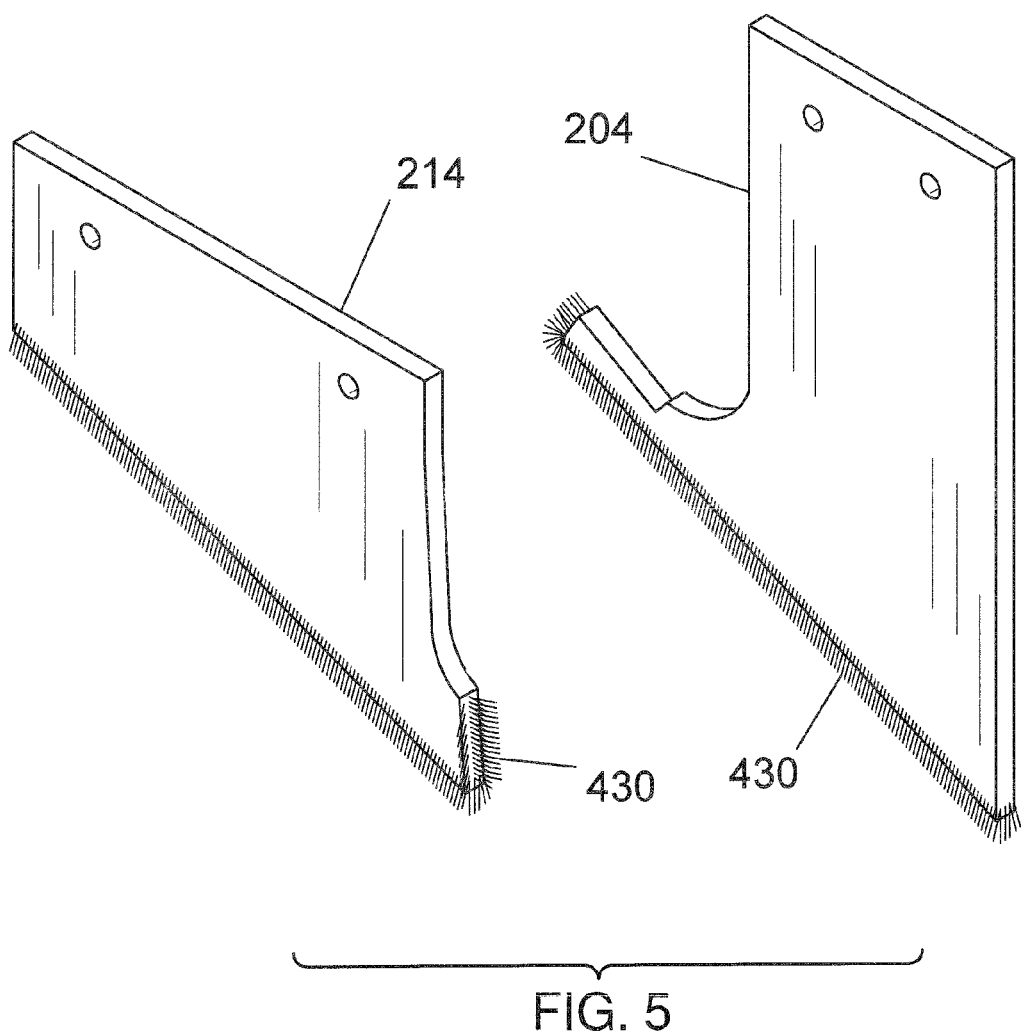
FIG. 5 is a perspective top view of an alternate embodiment of the first side and second side wiper bar flaps of the present invention.
Figure 6:
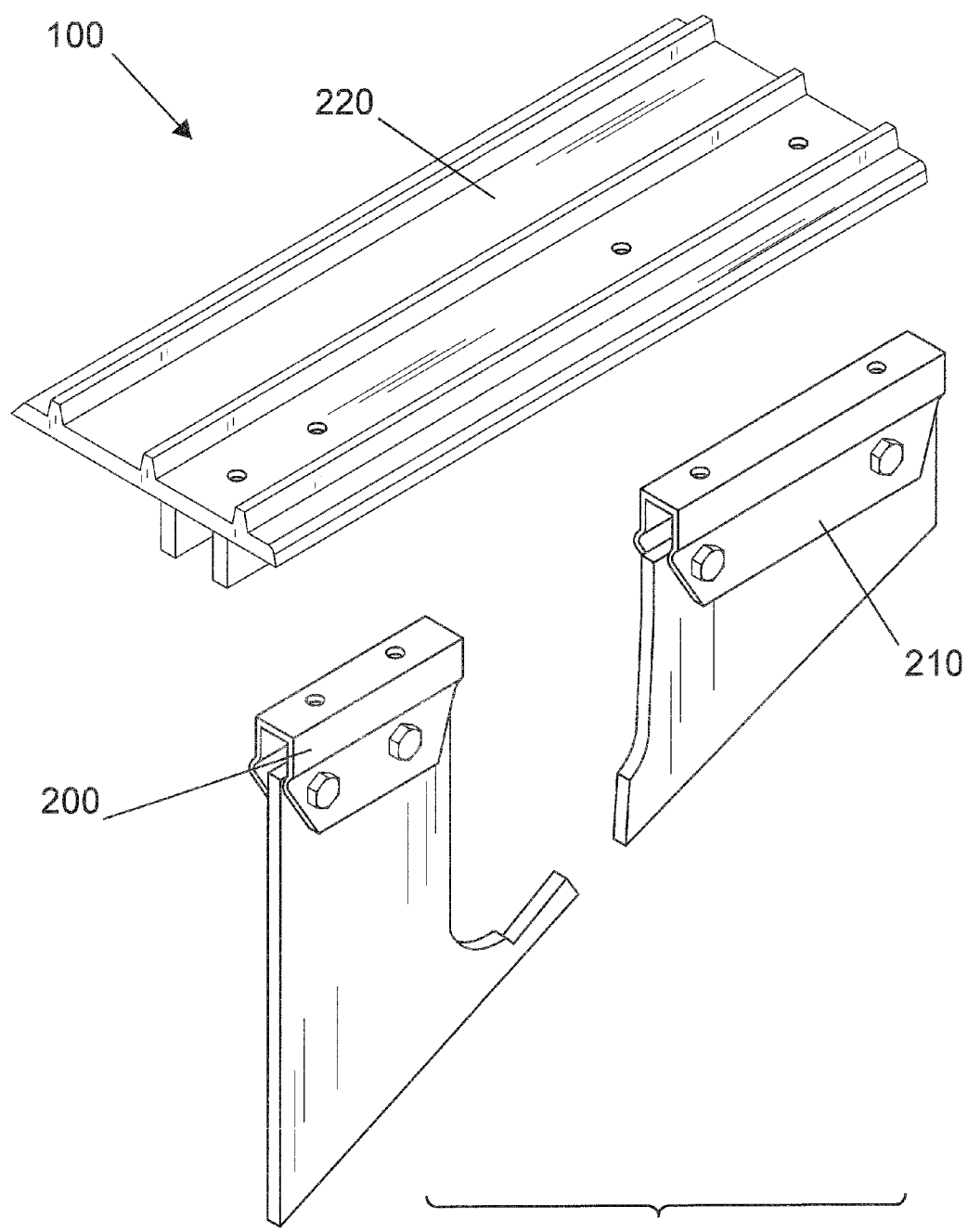
FIG. 6 is a perspective top view of an alternate embodiment of the track cleaning system of the present invention.

Following is a list of elements corresponding to a particular element referred to herein:
100 Track cleaning system
200 First side wiper bar assembly
202 First side wiper bar bracket
204 First side wiper bar flap
210 Second side wiper bar assembly
212 Second side wiper bar bracket
214 Second side wiper bar flap
220 Track shoe
222 Track shoe exterior surface
224 Track shoe interior surface
226 Track shoe first side
228 Track shoe second side
300 Endless track assembly
320 Track assembly inside cavity
330 Track assembly proximal open end
420 Debris
430 Brush Referring now to FIG. 1-7, the present invention features a track cleaning system (100) for continuous cleaning of an endless track assembly (300) on a machine so equipped.

In some embodiments, the system (100) has at least one first side wiper bar assembly (200) with a first side wiper bar bracket (202) and a first side wiper bar flap (204). In some embodiments, the first side wiper bar flap (204) is detachably connected to the first side wiper bar bracket (202). In some embodiments, the first side wiper bar flap (204) is connected to the first side wiper bar bracket (202) via one or more bolts, washers and nuts.

In some embodiments, the system (100) has at least one second side wiper bar assembly (210) with a second side wiper bar bracket (212) and a second side wiper bar flap (214). In some embodiments, the second side wiper bar flap (214) is detachably connected to the second side wiper bar bracket (212). In some embodiments, the second side wiper bar flap (214) is connected to the second side wiper bar bracket (212) via one or more bolts, washers and nuts.

In some embodiments, the system (100) has at least one track shoe (220) with a track shoe exterior surface (222) and a track shoe interior surface (224). In some embodiments, the track shoe (220) is a member of the endless track assembly (300). In some embodiments, the first side wiper bar bracket (202) is attached to the track shoe interior surface (224) of the track shoe first side (226), and the second side wiper bar bracket (212) is attached to the track shoe interior surface (224) of the track shoe second side (228).

In some embodiments, the first side wiper bar bracket (202) is attached to the track shoe interior surface (224) of the track shoe first side (226) via one or more bolts, washers and nuts. In some embodiments, the first side wiper bar bracket (202) is attached to the track shoe interior surface (224) of the track shoe first side (226) via a set of two bolts and nuts with a plurality of washers. In some embodiments, the first side wiper bar bracket (202) is attached to the track shoe interior surface (224) of the track shoe first side (226) via four bolts and nuts with a plurality of washers.

In some embodiments, the second side wiper bar bracket (212) is attached to the track shoe interior surface (224) of the track shoe second side (228) via one or more bolts, washers and nuts. In some embodiments, the second side wiper bar bracket (212) is attached to the track shoe interior surface (224) of the track shoe second side (228) via a set of two bolts and nuts with a plurality of washers. In some embodiments, the second side wiper bar bracket (212) is attached to the track shoe interior surface (224) of the track shoe second side (228) via a set of four bolts and nuts with a plurality of washers.

In some embodiments, the endless track assembly (300) is a continuous loop. In some embodiments, the endless track assembly (300) has a track inner frame (340). In some embodiments, a track assembly inside cavity (320) is formed by a track assembly outer periphery (310) of the endless track assembly (300). In some embodiments, the track assembly inside cavity (320) is in between the track assembly outer periphery (310) of the endless track assembly (300) and the track inner frame (340). In some embodiments, the track assembly inside cavity (320) has a track assembly proximal open end (330) that is proximal to the track inner frame (340) and a track assembly distal open end that is distal to the track inner frame (340).

In some embodiments, upon rotational operation of the endless track assembly (300), the track cleaning system (100) rotates about the track assembly inside cavity (320). In some embodiments, debris (420) is scraped from and away from the track assembly inside cavity (320) toward the track assembly proximal open end (330) and the track assembly distal open end. In some embodiments, debris (420) is thrust away from the track assembly proximal open end (330) and the track assembly distal open end.

In some embodiments, debris (420) is removed from the track assembly inside cavity (320), thus less debris (420) is introduced to the endless track assembly components of the endless track assembly (300).

In some embodiments, the first side wiper bar bracket (202) is comprised of two or more pieces. In some embodiments, the second side wiper bar bracket (212) is comprised of two or more pieces.

In some embodiments, the first side wiper bar assembly (200) and the second side wiper bar assembly (210) are connected.

In some embodiments, the first side wiper bar flap (204) and the second side wiper bar flap (214) are constructed from a stiff, pliable material. In some embodiments, the first side wiper bar flap (204) and the second side wiper bar flap (214) are constructed from a rubber composite material. In some embodiments, the first side wiper bar flap (204) and the second side wiper bar flap (214) are constructed from polyurethane. In some embodiments, the first side wiper bar flap (204) and the second side wiper bar flap (214) are constructed from a reinforced material. In some embodiments, the first side wiper bar flap (204) and the second side wiper bar flap (214) are constructed from a rigid material.

In some embodiments, the first side wiper bar flap (204) and the second side wiper bar flap (214) have a bottom edge that runs at an angle with respect to the top edge. In some embodiments, the first side wiper bar flap (204) and the second side wiper bar flap (214) have a side edge that is trimmed to a unique shape for clearance of the endless track assembly components during operation of the track cleaning system (100).

In some embodiments, the first side wiper bar flap (204) and the second side wiper bar flap (214) have a reinforcement structure located on a surface of the first side wiper bar flap (204) and the second side wiper bar flap (214). In some embodiments, the reinforcement structure is located on the bottom edge of the first side wiper bar flap (204) and the second side wiper bar flap (214).

In some embodiments, the track shoe (220) has the first side wiper bar bracket (202) and the second side wiper bar bracket (212) integrated into the track shoe interior surface (224). In some embodiments, the track shoe (220) and the first side wiper bar bracket (202) are constructed from, or cast from a one piece unit. In some embodiments, the track shoe (220) and the second side wiper bar bracket (212) are constructed from, or cast from a one, piece unit. These methods of construction are familiar to those of ordinary skill in the art.

In some embodiments, the first side wiper bar bracket (202) and the second side wiper bar bracket (212) are constructed from metal. In some embodiments, the first side wiper bar bracket (202) and the second side wiper bar bracket (212) are constructed from iron. In some embodiments, the first side wiper bar bracket (202) and the second side wiper bar bracket (212) are constructed from steel. In some embodiments, the first side wiper bar bracket (202) and the second side wiper bar bracket (212) are constructed from plastic.

In some embodiments, the first side wiper bar flap (204) has a brush (430). In some embodiments, the second side wiper bar flap (214) has a brush (430).

In some embodiments, the width of the first side wiper bar assembly (200) when measured from a first side to a second side is between 0" and 12". In some embodiments, the width of the first side wiper bar assembly (200) when measured from the first side to the second side is between 12" and 24". In some embodiments, the width of the first side wiper bar assembly (200) when measured from the first side to the second side is between 24" and 36". In some embodiments, the width of the first side wiper bar assembly (200) when measured from the first side to the second side is greater than 36".

In some embodiments, the height of the first side wiper bar assembly (200) when measured from a bottom edge to a top edge is between 0" and 12". In some embodiments, the height of the first side wiper bar assembly (200) when measured from the bottom edge to the top edge is between 12" and 24". In some embodiments, the height of the first side wiper bar assembly (200) when measured from the bottom edge to the top edge is between 24" and 36". In some embodiments, the height of the first side wiper bar assembly (200) when measured from the bottom edge to the top edge is greater than 36".

In some embodiments, the width of the second side wiper bar assembly (210) when measured from a first side to a second side is between 0" and 12". In some embodiments, the width of the second side wiper bar assembly (210) when measured from the first side to the second side is between 12" and 24". In some embodiments, the width of the second side wiper bar assembly (210) when measured from the first side to the second side is between 24" and 36". In some embodiments, the width of the second side wiper bar assembly (210) when measured from the first side to the second side is greater than 36".

In some embodiments, the height of the second side wiper bar assembly (210) when measured from a bottom edge to a top edge is between 0" and 12". In some embodiments, the height of the second side wiper bar assembly (210) when measured from the bottom edge to the top edge is between 12" and 24". In some embodiments, the height of the second side wiper bar assembly (210) when measured from the bottom edge to the top edge is between 24" and 36". In some embodiments, the height of the second side wiper bar assembly (210) when measured from the bottom edge to the top edge is greater than 36".

In some embodiments, the thickness of the first side wiper bar flap (204) when measured from a front surface to a rear surface is between 0" and ¼". In some embodiments, the thickness of the first side wiper bar flap (204) when measured from the front surface to the rear surface is between ¼" and ½". In some embodiments, the thickness of the first side wiper bar flap (204) when measured from the front surface to the rear surface is between ½" and 1". In some embodiments, the thickness of the first side wiper bar flap (204) when measured from the front surface to the rear surface is greater than 1".

In some embodiments, the thickness of the second side wiper bar flap (214) when measured from a front surface to a rear surface is between 0" and ¼". some embodiments, the thickness of the second side wiper bar flap (214) when measured from the front surface to the rear surface is between ¼" and ½". In some embodiments, the thickness of the second side wiper bar flap (214) when measured from the front surface to the rear surface is between ½" and 1". In some embodiments, the thickness of the second side wiper bar flap (214) when measured from the front surface to the rear surface is greater than 1".

As used herein, the term "about" refers to plus or minus 10% of the referenced number. For example, an embodiment wherein an assembly is about 10 inches in length includes an assembly that is between 9 and 11 inches in length.

The disclosures of the following U.S. Patents are incorporated in their entirety by reference herein: U.S. Pat. No. 3,899,219; U.S. Pat. No. 3,976,337; U.S. Pat. No. 4,830,439; U.S. Pat. No. 5,725,292; U.S. Pat. No. 5,775,447; U.S. Pat. No. 6,247,547; U.S. Pat. No. 6,536,851; U.S. Pat. No. 7,832,814 B2; U.S. Pat. No. D598,937.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A track cleaning system (100) for continuous cleaning of an endless track assembly (300) on a machine so equipped, said system (100) comprising:
   (a) at least one first side wiper bar assembly (200) having a first side wiper bar bracket (202) and a first side wiper bar flap (204), said first side wiper bar flap (204) detachably connected to the first side wiper bar bracket (202);
   (b) at least one second side wiper bar assembly (210) having a second side wiper bar bracket (212) and a second side wiper bar flap (214), said second side wiper bar flap (214) detachably connected to the second side wiper bar bracket (212); and
   (c) at least one track shoe (220) having a track shoe exterior surface (222) and a track shoe interior surface (224), said track shoe (220) being a member of the endless track assembly (300), wherein the first side wiper bar bracket (202) is attached to the track shoe interior surface (224) of a track shoe first side (226), wherein the second side wiper bar bracket (212) is attached to the track shoe interior surface (224) of a track shoe second side (228);
wherein a track assembly inside cavity (320) is formed by a track assembly outer periphery (310) of the endless track assembly (300) having a track assembly proximal open end (330) and a track assembly distal open end, wherein upon rotational operation of the endless track assembly (300), the track cleaning system (100) rotates about the track assembly inside cavity (320),
whereby debris (420) is scraped from and away from the track assembly inside cavity (320) toward the track assembly proximal open end (330) and the track assembly distal open end, wherein debris (420) is removed from the track assembly inside cavity (320), wherein less debris (420) is introduced to an endless track assembly components of the endless track assembly (300).

2. The system (100) of claim 1, wherein the first side wiper bar bracket (202) is comprised of two or more pieces.

3. The system (100) of claim 1, wherein the second side wiper bar bracket (212) is comprised of two or more pieces.

4. The system (100) of claim 1, wherein the first side wiper bar assembly (200) and the second side wiper bar assembly (210) are connected.

5. The system (100) of claim 1, wherein the first side wiper bar flap (204) and the second side wiper bar flap (214) are constructed from a stiff, pliable material.

6. The system (100) of claim 1, wherein the first side wiper bar flap (204) and the second side wiper bar flap (214) are constructed from a rubber composite material.

7. The system (100) of claim 1, wherein the first side wiper bar flap (204) and the second side wiper bar flap (214) are constructed from polyurethane.

8. The system (100) of claim 1, wherein the first side wiper bar flap (204) and the second side wiper bar flap (214) are constructed from a reinforced material.

9. The system (100) of claim 1, wherein the first side wiper bar flap (204) and the second side wiper bar flap (214) are constructed from a rigid material.

10. The system (100) of claim 1, wherein the track shoe (220) comprises the first side wiper bar bracket (202) and the second side wiper bar bracket (212) disposed thereon.

11. The system (100) of claim 1, wherein the first side wiper bar bracket (202) and the second side wiper bar bracket (212) are constructed from metal.

12. The system (100) of claim 1, wherein the first side wiper bar flap (204) comprises a brush (430) disposed thereon.

13. The system (100) of claim 1, wherein the second side wiper bar flap (214) comprises a brush (430) disposed thereon.

* * * * *